Nov. 25, 1952 V. JOHNSON 2,618,863
PLUMB BOB
Filed Sept. 24, 1951
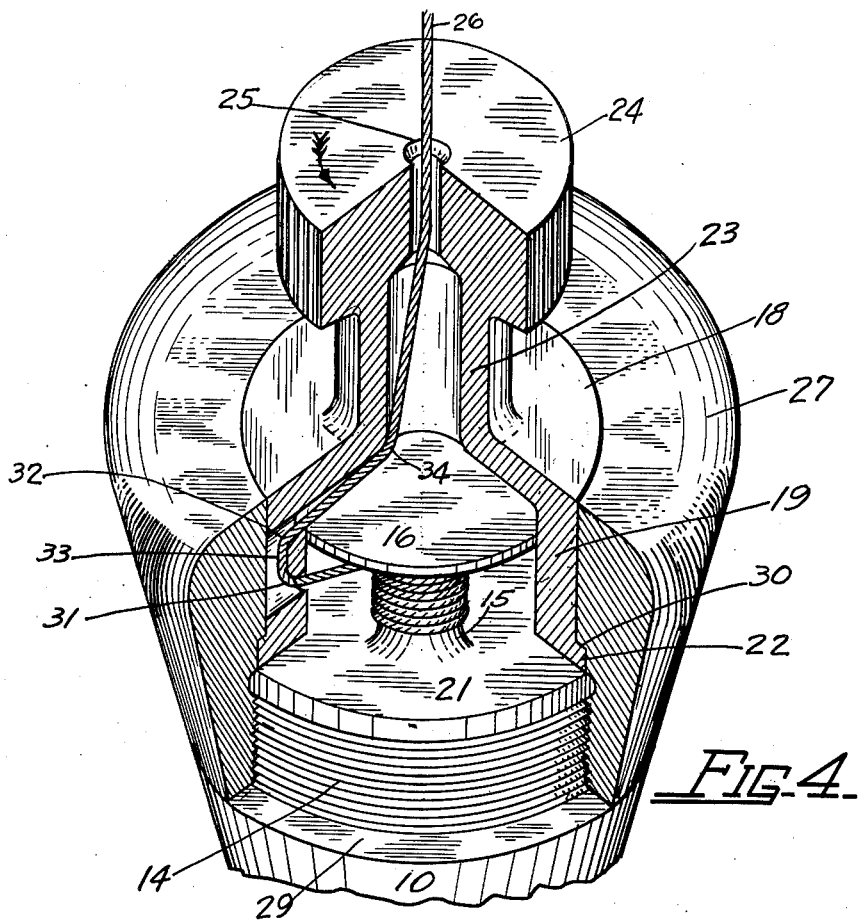
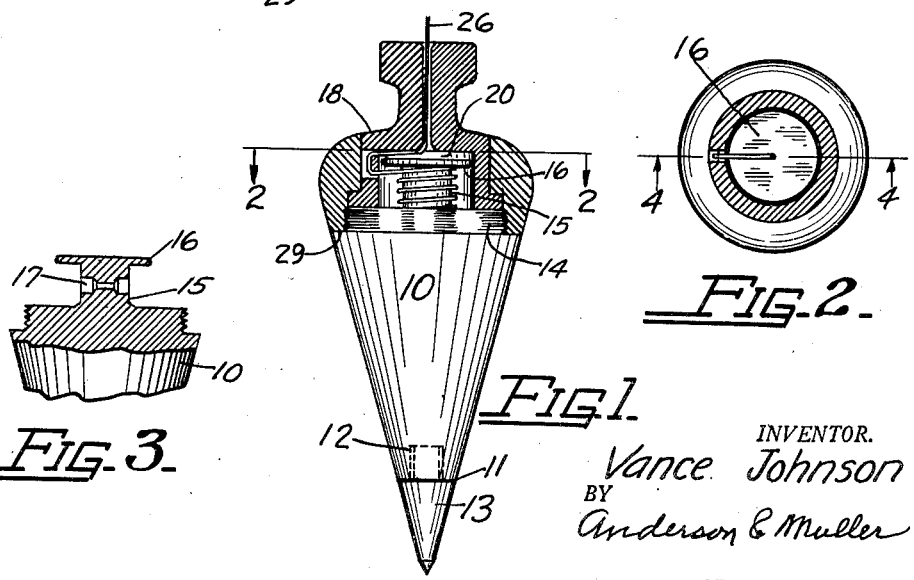
INVENTOR.
Vance Johnson
BY
Anderson & Muller
ATTORNEYS Patented Nov. 25, 1952

2,618,863

UNITED STATES PATENT OFFICE 2,618,863

PLUMB BOB

Vance Johnson, Denver, Colo.

Application September 24, 1951, Serial No. 247,920

1 Claim. (Cl. 33—217)

This invention relates to improvements in plumb bobs and has more particular reference to a plumb bob of the type in which a spool or the like is positioned within the body of the plumb bob for storing the plumb line and which has means accessible from the outside for winding and unwinding the line from the spool.

Carpenters, masons, surveyors and many others find extensive uses for plumb bobs to determine vertical lines and many different kinds of plumb bobs are available on the market.

The most usual type of plumb bob has no storage space for the plumb line and the latter must therefore be wound about the plumb bob or taken care of in some other way. The lines connected with the plumb bobs are long and the problem of storing the line when the plumb bob is not in use is often times difficult.

There are available various types of plumb bobs having means located on the inside for storing the line and applicant is not claiming to be the inventor of this in its broadest aspect.

It is the object of this invention to produce a plumb bob of the type indicated which shall have a minimum number of parts and be of such simple construction that it can be readily manufactured and assembled.

Another object is to produce a plumb bob of the type indicated, which shall be so designed and constructed that the line can be conveniently wound and unwound by rotating a knob conveniently positioned on the outside.

Another objective of the invention is to produce a plumb bob of the type indicated which shall be provided with a simple means for holding the plumb line in adjusted position during operation.

The above and other objectives that may become apparent as the description proceeds are attained by means of a construction and arrangement of parts that will now be described in detail and for this proper reference will be had to the accompanying drawing in which the invention has been illustrated in its preferred form and in which Figure 1 is an elevational view showing a portion of the plumb bob in elevation and other portions thereof in diametrical section.

Figure 2 is a section taken on line 2—2, Figure 1.

Figure 3 is a section taken on line 4—4, Figure 2 and shows the opening provided in the spool portion for anchoring the plumb line thereto and Figure 4 is a view partly in section and partly in perspective showing the parts to an enlarged scale.

Referring now to the drawing reference numeral 10 designates the body of the plumb bob which is frusto-conical in shape and is truncated on line 11. The truncated end is provided with a threaded opening 12 to which the steel tip 13 is threadably connected. The upper end of body 10 has a short threaded section 14 and a central spool like member comprising a cylindrical portion 15 and an upper flange 16. The cylindrical portion is provided with a diametrical opening 17 for anchoring a plumb line thereto. This opening will be referred to hereinafter. Surrounding the spool members 15 and 16 is a rotatable winding and unwinding element which has been designated by reference numeral 18. This rewinding element has the shape shown quite clearly in Figures 1 and 4 from which will be seen that it has a hollow cylindrical cup portion, whose wall has been designated by reference numeral 19. The inside diameter of the opening is substantially equal to the outside diameter of flange 16. The depth of the opening is somewhat greater than the distance from the top of the body portion 10 to the top of flange 16 leaving a circular space 20, the purpose of which will hereinafter appear. The lower end of wall 19 rests on the annular surface 21 as shown in Figure 4. The lower end of wall 19 is provided with an outwardly extending flange 22. Extending upwardly from the cylindrical opening in member 18 is a tubular neck 23 which terminates in an enlarged head 24. The neck and head are provided with a central opening 25 through which the plumb line 26 extends. The rewinding element is held in place by an annular coupling member 27. The inner surface of this member near the lower end thereof has a threaded portion 28 that can be screwed on to the threaded portion 14 on member 10. The lower end of the coupling member has a flat annular surface that fits against the surface 29 of member 10. The coupling member has a central opening of the proper size to receive the wall 19 of the rewinding element and is provided with an annular flat surface 30 that fits against the upper surface of flange 22. Member 27 holds the rewinding element in place but permits it to be freely rotated therein. Wall 19 is provided at one point with two spaced openings, the lower of which has been designated by reference numeral 31 and the upper by reference numeral 32. A shallow groove 33 connects the two openings, as shown quite clearly in Figure 4. Opening 31 is positioned below flange 16 and opening 32 above flange 16. The plumb line extends through opening 25 and passes thence outwardly through opening 32 thence downwardly in groove 33 and inwardly through opening 31, the end of the line extends through hole 17 in the central body 15 of the spool like portion and the end of the line is secured in the opening so as to prevent its accidental removal.

Let us now assume that the plumb bob which has been described has been in use and the plumb line is therefore unwound to a considerable length and that it is desired to rewind the plumb line on the spool. The operator holds the body of the plumb bob against rotation and turns the knob 24 in a counter-clockwise direction as indicated by the arrow in Figure 4. Since part 15, to which the plumb line is anchored is stationary and since the plumb line passes through the two openings at 31 and 32 it is evident that every time the rewinding element is rotated one complete turn the line will be wound one complete turn on the spool portion; this is then continued until the line is entirely rewound or until the length outside of the plumb bob has been reduced to that desired. When the plumb bob is to be used the operation just described is reversed, that is, the knob 24 is rotated in a clockwise direction thereby unwinding the line from the spool until the desired length is obtained.

Particular attention is called to the rewinding element and to the construction shown in Figure 2 in which the line may pass outwardly through opening 32 thence downwardly and inwardly through opening 31 thus making a turn of 180°. The bend in the line in connection with the friction caused by the line passing around the corner 34 is sufficient to hold the line in any adjusted position. It is evident that the line cannot be unwound from the spool portion unless the rewinding element is turned relative to the body and since there is always some resistance to rotation and since the plumb line acts on a rather small radius arm the torque per unit of tension in the line is comparatively small and with the construction shown the line will not unwind due to the weight of the plumb bob and it requires a very strong pull to make the rewinding element turn in response to tension in the plumb line.

The construction of the rewinding element to which attention has been called is of great importance in the construction and operation of the plumb bob because by providing the 180° bend in the line as it passes through openings 31 and 32, the opening in the rewinding element can be made of size that clears the periphery of flange 16 with sufficient space to permit the plumb line to pass.

Having described the invention, what is claimed as new is:

A plumb bob formed from three separate parts one of which is a conical body adapted for use with the vertex extending downwardly and the base at the top, the base having a threaded section of smaller diameter spaced from the outer surface by an annular area lying in a plane perpendicular to the axis, a cylindrical section of smaller diameter projecting upwardly from the base in co-axial relation thereto, the upper end of said projection having a circular flange of greater diameter forming with the base surface of the body a spool-like portion about which a plumb line may be wound, the cylindrical section having an opening for the reception of the end of a plumb line, an inverted cup-like rewinding element surrounding the spool-like portion, having an outwardly extending flange at its lower end, said rewinding element having an upwardly extending tubular neck terminating in a knob for turning it, the depth of the cup-like recess being greater than the height of the spool-like portion whereby a circular space is formed above the latter, an annular coupling element having the inner surface provided with a threaded section for engagement with the threaded section on the body and an inwardly extending annular flange for engagement with the flange on the rewinding element, the wall of the rewinding element having two radial openings one communicating with the space between the base of the body member and the under surface of the flange on the spool-like portion and the other communicating with the circular space above said flange, and a plumb line having one end anchored to the spool-like portion, passing thence outwardly through the opening in the wall of the rewinding element, thence inwardly through the other opening in said wall into the circular chamber above the spool-like member and thence outwardly through the tubular neck.

VANCE JOHNSON.

REFERENCES CITED

The following references are of record in the file of this patent:

UNITED STATES PATENTS

| Number | Name | Date |
| --- | --- | --- |
| 1,708,778 | Gowell | Apr. 9, 1924 |
| 2,509,559 | Bynum | May 30, 1950 |